Feb. 24, 1942.    C. W. STRONG ET AL    2,274,106
WEATHERPROOF CABINET
Filed Feb. 14, 1940    3 Sheets-Sheet 1
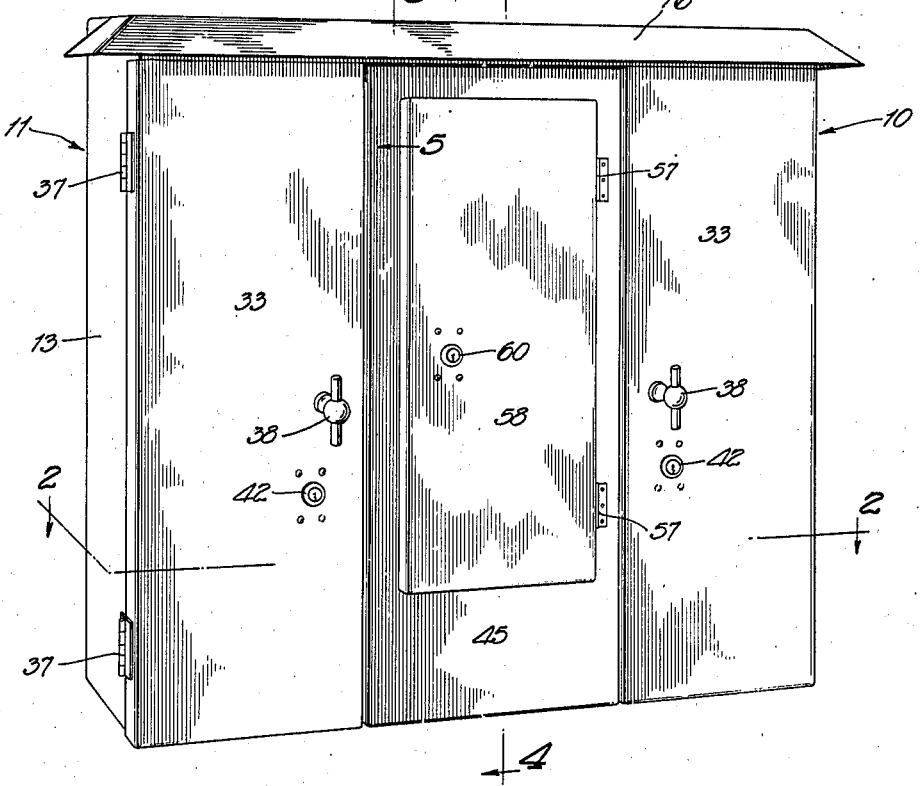
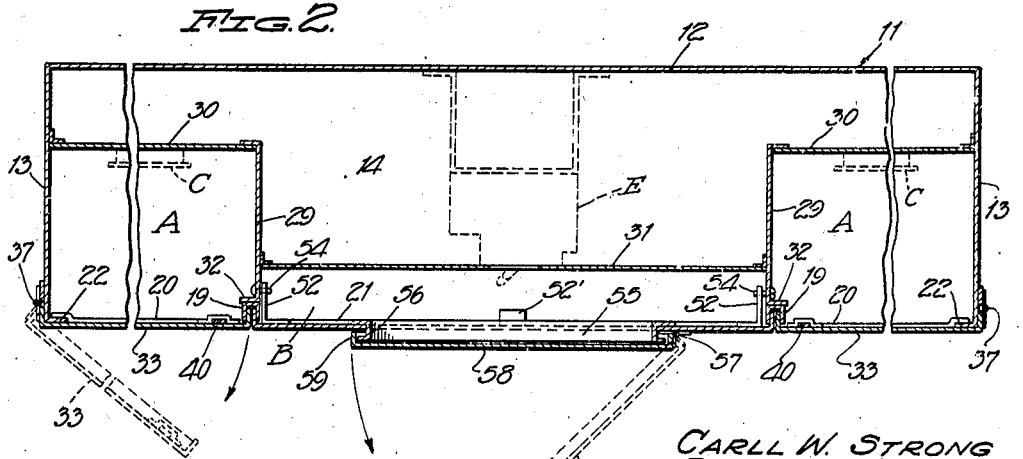
CARLL W. STRONG
RALPH M. WALKER.
INVENTORS.
BY Ely & Pattison
ATTORNEYS.

Feb. 24, 1942.　　C. W. STRONG ET AL　　2,274,106
WEATHERPROOF CABINET
Filed Feb. 14, 1940　　3 Sheets-Sheet 2
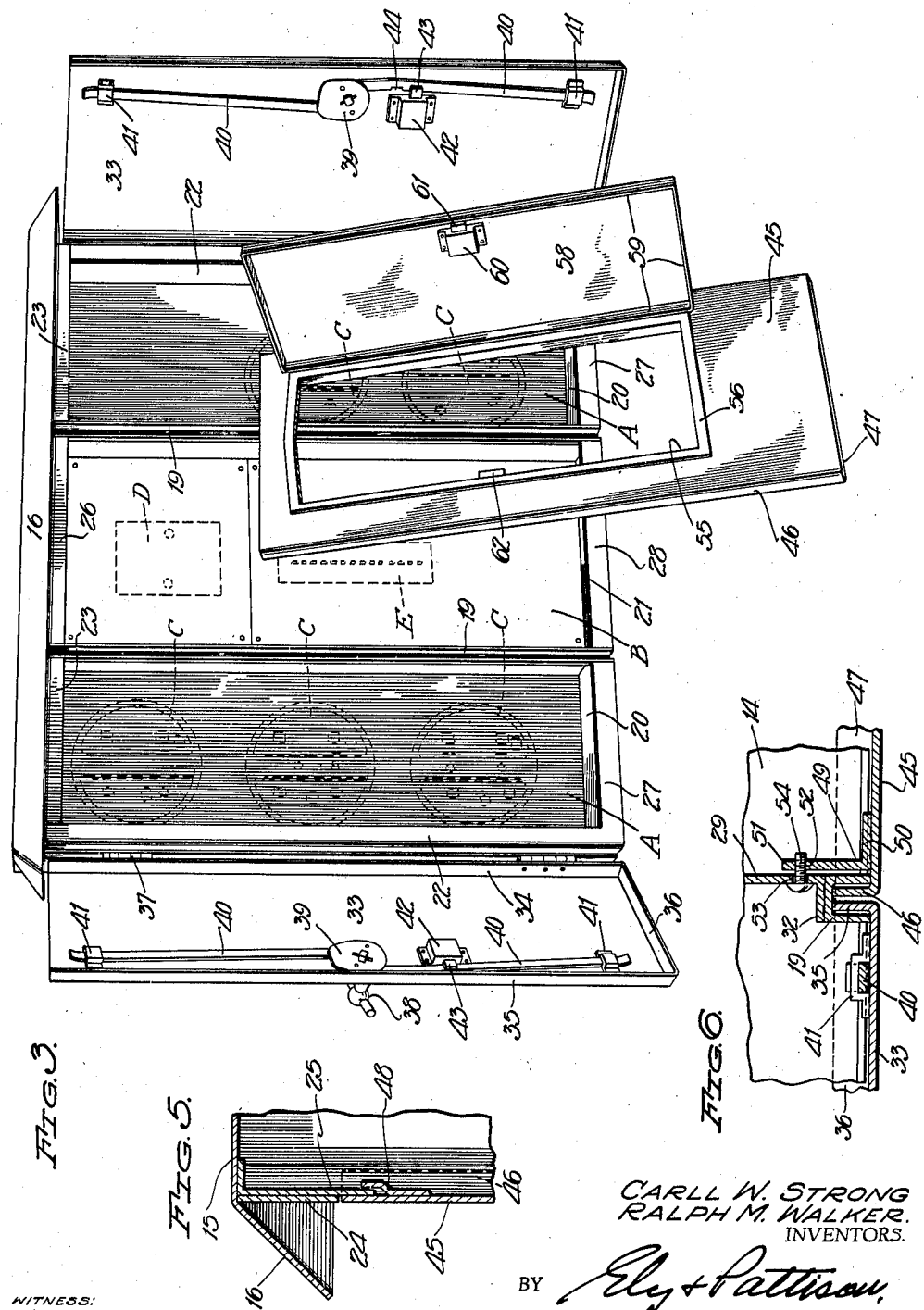
CARLL W. STRONG
RALPH M. WALKER.
INVENTORS.
BY Ely + Pattison,
ATTORNEYS.

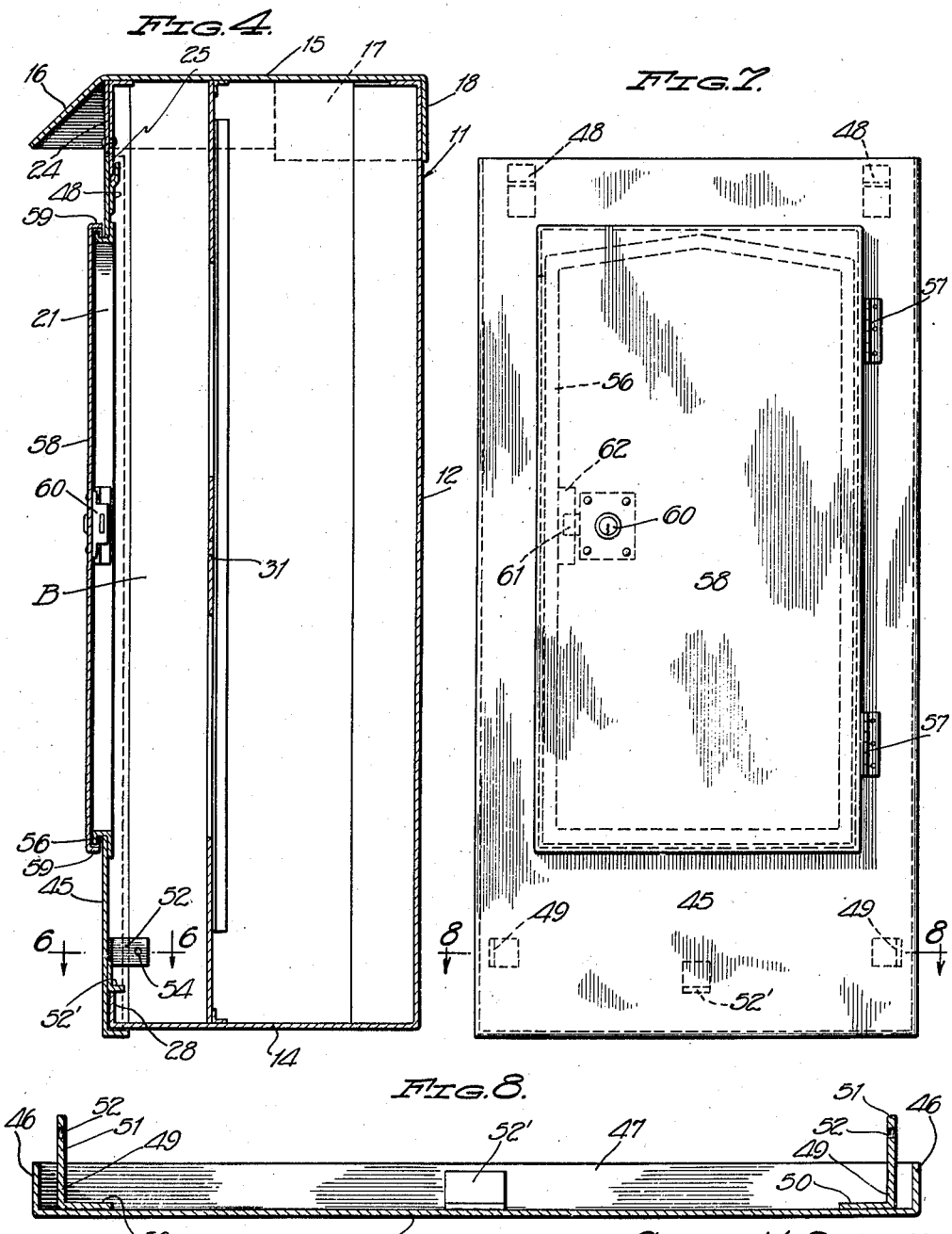

Patented Feb. 24, 1942

2,274,106

UNITED STATES PATENT OFFICE 2,274,106

WEATHERPROOF CABINET

Carll W. Strong and Ralph M. Walker, Atlanta, Ga.; Mabel B. Walker and Trust Company of Georgia, executors of said Ralph M. Walker, deceased, assignors to Walker Electrical Company, Atlanta, Ga., a corporation of Georgia Application February 14, 1940, Serial No. 318,914

7 Claims. (Cl. 312—100)

This invention relates to improvements in weatherproof cabinets, and whereas it is capable of many uses, the same has been primarily designed for the housing of electrical apparatus such as electric meters, circuit breakers and the like, and which may be installed exteriorly of a subscriber's home, factory, apartment house, thus exposing the installation to the elements.

It is one of the important features of this invention to provide a weatherproof cabinet from which rain water is excluded without the use of sealing gaskets which to be effective must be used between machined surfaces, or other sealing elements which rapidly deteriorate and require frequent replacement to maintain the cabinet weatherproof.

Another features of the invention resides in a metal weatherproof cabinet which may have a multiplicity of separate compartments which open through the front of the cabinet, and end compartments being normally closed by locked doors while the intermediate compartment or compartments are closed by a removable cover, the vertical flange edges of the cover and adjacent vertical flange edge of the doors when closed, fitting into vertical channels or gutters, whereby any rain water which might enter the channels will run downwardly therein and drain from the open bottom thereof, rather than seeping into the compartments of the cabinet through the joint between the doors, cover, and the trim.

Another feature of the invention is to provide a novel means for the removability, or fastening of the cover in closed position over the open front of the intermediate compartment of the cabinet, whereby access to the fastening means may only be had through the end compartments which are normally closed by locked doors. By an arrangement such as stated above, the cover is protected against unauthorized removal, for access to the cover fastening means may only be had by an authorized person having the proper key to unlock the doors of the end compartments.

Other features of the invention reside in a weatherproof cabinet which is simple and rugged of construction, neat and attractive in appearance, and within which electrical apparatus may be housed in an orderly manner so as to be conveniently accessible to an authorized person when the doors are unlocked and swung to an open position.

Other features of the invention will become apparent as the following specification is read in conjunction with the accompanying drawings, in which:

Figure 1 is a perspective view of the weatherproof cabinet with the doors in closed locked position.

Figure 2 is an enlarged horizontal sectional view on the line 2—2 of Figure 1, with parts broken away and illustrating the center door and one of the end doors in partially open position in dotted lines.

Figure 3 is a perspective view of the cabinet with the panel separated from the cabinet body and the doors in open position.

Figure 4 is an enlarged vertical transverse sectional view on the line 4—4 of Figure 1.

Figure 5 is an enlarged detail vertical sectional view on the line 5—5 of Figure 1.

Figure 6 is an enlarged detail horizontal sectional view on the line 6—6 of Figure 4.

Figure 7 is a front elevational view of the cover per se.

Figure 8 is an enlarged horizontal sectional view on the line 8—8 of Figure 7.

Referring to the drawings by reference characters, the numeral 10 designates our improved weatherproof cabinet in its entirety, and whereas it is shown in the drawings for the specific purpose of housing electric meters, circuit breakers, and other apparatus for supplying electric service, we do not wish to be limited to such use, for the same is capable of being designed for many other uses where a cabinet or box is installed out-of-doors and it is desirous of preventing rain water from entering the cabinet through door and cover joints.

The weatherproof cabinet 10 includes a rectangular shaped body or casing 11 which is open at its front and comprises a rear wall 12, side or end walls 13—13, a bottom wall 14, and a top wall 15. Extending forwardly and downwardly from the top wall 15 is an eave 16, the same extending across the entire open front of the body and rearwardly partway along the side walls 13—13. The eave 16 serves to shed rain water away from the open front and front corners of the body 11. The body 11 is constructed of sheet metal of one or more pieces, and in the drawings we have illustrated the top wall 15 and eave 16 as constructed of one piece of metal and the sides, bottom, and rear walls as constructed of a separate piece of metal. These various walls may be formed by a drawing operation to eliminate leaky joints or they may be bent and the joints welded. When two pieces of material are connected, such as the top wall and side and rear walls, the same may be secured by welding or other means, and in the drawings, the top wall 15 is provided with depending side flanges 17—17 which fit against and are fastened to the side walls 13—13, and a rear flange 18 which fits against and is fastened to the rear wall 12. The eave 16 is also formed integral with the top wall 15 so that there are no joints between the roof of the cabinet and the upstanding walls thereof which might otherwise become leaky and allow rain water to seep into the interior of the body 11 through the top thereof.

Mounted at the open front of the body 11 is a pair of spaced vertical channel rails 19—19 of U-shape in cross section, the same dividing the open front of the body into a pair of end door openings 20—20, and an intermediate opening 21. Whereas a pair of channel rails 19 have been shown to form a three compartment cabinet, more or less rails may be employed when more or less compartments are to be formed in the cabinet. The channel rails are fixedly mounted with their open sides facing forwardly and having their lower open ends passing through slots in the bottom wall 14. The rails 19—19 constitute inner door jambs along one side of the door openings 20—20, the outer jamb of each door opening being defined by an inwardly extending flange 22 formed integral with each side wall 13. The top of each door opening 20 consists of a depending flange 23 depending from the top wall 14 and which is partially lapped by a plate 24 which extends entirely across the front of the body and secured to the outside of the flange 23 by rivets, spot welding or the like. The plate 24 terminates short of the lower edge of the flange 23. A flange 25 similar to the flanges 23 constitutes the top of the intermediate opening 21 and to which the plate 24 is also connected. The bottom of each door opening 20 is defined by an upstanding flange 27 and the bottom of the intermediate opening is defined by an upstanding flange 28, the flanges 27 and 28 being integral with the bottom wall 14. Thus it will be understood that each door opening 20 is bounded by a vertical channel rail 19 constituting an outer door jamb, a vertical flange 22 constituting an inner door jamb, and by the top and bottom flanges 23 and 27. The intermediate opening 21 is bounded by the channel rails 19—19, top flange 26 and bottom flange 28.

In the drawings, we have illustrated the cabinet 10 as being designed to accommodate a plurality of socket type electric meters and their associated circuit breakers. The interior of the cabinet body is provided with vertical transversely extending partition walls 29—29 which extend rearwardly from the vertical rails 19—19 to a point short of the rear wall 12 and are joined by longitudinal walls 30—30 which meet the side walls 13—13. These partition walls extend the full height of the cabinet body and divide the same into a pair of end compartments A—A which are accessible through the door openings 20—20. A longitudinal slotted partition 31 connects with the partition walls 29—29 forming an intermediate compartment B which is accessible through the opening 21. Electric meter sockets C are mounted in the partition walls 30—30 whereas the master circuit breaker D or master switch, and the individual meter circuit breakers E or pull out switches or other circuit protective devices are shown as mounted behind the partition wall 31 with their actuating handles extending through the wall 31. The showing of the meter sockets and circuit breakers is merely illustrative, for as previously mentioned, the interior of the cabinet 10 may contain other apparatus which must be readily accessible and protected against the elements. The front edges of the partition walls 29—29 are provided with right angle flanges 32 and are welded to the back flat walls of the rails 19—19.

The end compartments A—A are closed by metal doors 33—33. Each door 33 is provided with an inner side flange 34, an outer side flange 35 and a bottom flange 36. The flanges 34, 35, and 36 extend inwardly and bound three sides of the door 33. The inner sides of the doors 33 are hinged to the side walls 13—13 as at 37 and swung inwardly toward the door opening 21—21 and outwardly away therefrom. Each door 33 is of such a length that, when it is in closed position, the bottom flange 36 snugly fits beneath the bottom wall 14, and the top of the door laps the depending flange 23, and the door is of a width that the inner side flange 34 fits flat against the side wall 13 and the outer side flange 35 is disposed within the channel rail 19 adjacent the outer side wall thereof as best illustrated in Figure 2 of the drawings. The thickness of the flange 35 is slightly less than one half the width of the channel rail 19 for a reason presently to be explained. Each door 33 is provided with a latch mechanism which in this instance consists of a turnable knob 38 disposed exteriorly of the door to which a disk 39 is connected and to which disk the inner ends of a pair of latch bolts 40—40 are pivotally and eccentrically connected whereby turning of the knob will cause the latch bolts to simultaneously move up and down. The latch bolts slide through guides 41 and have the outer ends bent outwardly to freely engage behind the flanges 20 and 23 when the door is closed and the latch bolts 40—40 are in extended position. The lock mechanism may be secured in a locked position by a key actuated lock 42 which has a lock bolt 43 which enters a keeper notch 44 in the lower latch bolt when the latch bolts are in extended latching position.

Having explained the closure means for the end compartments A—A, we shall now describe the closure means for the intermediate compartment B which consists of a removable metal cover 45. The cover 45 is provided with inwardly extending side flanges 46—46, and an inwardly extending bottom flange 47. The cover is of a length to enable the flange 47 to fit beneath the bottom wall 14 of the cabinet body and to permit the top of the cover to lap the flange 25 and fit beneath the bottom edge of the flange 24 as shown in Figure 4. The cover is of a width to enable the side flanges 46—46 to respectively fit into the respective channel rails 19—19 with the door flanges 35—35 when the doors 33—33 are in closed position. The rear side of the cover 45 adjacent the top thereof is provided with a pair of spaced clips 48 which engage behind the flange 25 when the cover is slipped inwardly and upwardly over the entrance opening 21. Also mounted on the rear side of the cover and disposed adjacent the bottom thereof are spaced horizontally alined angle members 49—49, the base sides 50 thereof being spot welded or otherwise secured to the cover while the outwardly extending portions constitute ears 51—51 which are respectively disposed parallel to the flanges 46—46. The ears 51 extend beyond the plane of the free edges of the flanges 46 so as to lap the partition walls 29—29. The outer portions of each ear 51 is provided with a screw threaded opening 52, and the threaded openings 52 respectively register with openings 53 in the partition walls 29. A screw 54 is first passed through each opening 53 and threads into the adjacent threaded opening 52. The screws are inserted into position through the compartments A—A and their heads are accessible only through the compartments A—A. The screws 54 and ears 51 serve as a fastening means for the cover which cannot be tampered with, for access thereto is only possible through the compartments A—A which are normally closed by the locked doors 33. Although a screw 54 has been shown and described, other removable fastening elements may be used in lieu thereof. The rear side of the cover is provided with a centrally located stop flange 52' which is disposed parallel to the bottom flange 47 and which rests upon the flange 28 when the cover is in position over the opening 21.

Access to the intermediate compartment B is impossible without disturbing the cover fastening means, and for reaching the compartment B, there is provided a rectangular shaped door opening 55 in the cover 45. A gutter 56 of trough shape in cross section extends about the four sides of the opening 55 to protect the same from rain water. The portion of the gutter 56 which is disposed at the top of the opening 55 is inclined from its middle outwardly toward the side vertical portions of the trough for draining water therefrom. Hinged at 57 to the cover of the door opening 55 is a door 58 having inwardly extending flanges 59 around the four sides thereof. The door 58 is of a size to enable the flanges 59 to abut against the cover and enclose the gutter 56. A key actuated lock 60 is provided on the door which includes a bolt 61 adapted to engage a keeper 62 fixed to the cover. If desired, an ordinary door knob and latch may be substituted for the key lock 60 for it may be desirable to have the intermediate compartment accessible to the subscriber of the electric service. When the door 58 is closed and locked, access to the intermediate compartment is prevented and the opening 56 is shielded from rain water seeping therein by reason of the gutter 56 and flanges 59. Any water which may enter the joints between the door 58 and the cover 45 is shed by the gutter 56.

From the foregoing description it will be understood that we have provided a weatherproof cabinet or box in which the joints between the door openings and their respective closures are protected against rain water, first, by reason of the overhanging eave, and secondly, by the novel weatherproofing flanges, channel rails, and gutters. Should rain water enter the channel rails 19—19 through the joints between the flanges 46 and 35, the same will drain down the channel rails and through the lower open ends thereof. All fixed joints and connections between bent walls, flanges, etc. are by welding or by "drawing" so as to render them weatherproof to withstand the elements to which an outdoor cabinet or box of this kind is subjected.

While we have shown and described what we consider to be the preferred embodiment of our invention, we wish it to be understood that variations in design may be resorted to if desired without in any way departing from the spirit of the invention.

Having thus described the invention, what we claim as new and desire to secure by Letters Patent of the United States, is:

1. A weatherproof cabinet comprising a body open at its front, a pair of spaced vertical channel members at the open front of said body having their open sides facing forwardly, a removable cover member closing the space between said channel members and having inwardly extending side flanges disposed in said channel members and only partially filling the same, fastening means securing said cover member in position between the channel members, a door hinged to each end of said body having a vertical inwardly extending flange, the inwardly extending flanges of the doors respectively being disposed in said channel members beside the flanges on said cover when the doors are in closed position, the adjacent flanges combined substantially filling the channel members, whereby said channel members and flanges weatherproof the vertical joints between the doors and the vertical sides of the cover.

2. A weatherproof cabinet comprising a rectangular shaped body open at its front, a pair of spaced vertical channel members at the open front thereof having their open sides facing forwardly and which coact with the top, bottom, and end walls of said body to define three separate side by side openings, a removable cover closing the center opening having vertical inwardly extending side flanges respectively disposed in said channel members closely adjacent the inner side walls thereof and in spaced relation with the outer side walls of the channel members, fastening means securing said cover in position over the central opening and accessible only through the end openings, a pair of doors for closing the end openings, each door being hinged to an end wall of said body at the front thereof and being provided with a vertical inwardly extending flange along the free vertical side thereof, the vertical inwardly extending flanges on the doors fitting into the channel members between the flanges of the cover and the outer side walls of the channel members and being disposed in close relation to said outer side walls, and lock means for securing the doors in closed position.

3. A weatherproof cabinet comprising a hollow metal body open at its front having partition walls therein dividing the interior thereof into end compartments and an intermediate compartment which open through the open front of said body, a pair of spaced vertical channel rails at the open front of said body having their open sides facing forwardly and respectively disposed between the entrance openings to the intermediate compartment and the end compartments and extending above and below the plane of the top and bottom of the entrance openings, a removable cover for closing the entrance opening to the intermediate compartment, vertical inwardly extending side flanges on said cover which are respectively disposed in the channel rails adjacent the inner side walls thereof, fastening means for securing the cover in position over the entrance opening to the intermediate compartment, a pair of doors respectively hinged to the outer sides of said body for closing the entrance openings to the end compartments, and vertical inwardly extending flanges provided on said doors for fitting into said channel rails between the outer side walls of said channel rails and the adjacent flanges of said cover.

4. A weatherproof cabinet as set forth in claim 3, including an eave overhanging the open front of the body at the top thereof for shielding the open top ends of the channel rails and the joints between the body and the tops of the doors and cover from rain water.

5. A weatherproof cabinet comprising a rectangular shaped sheet metal body open at its front, a pair of spaced vertical partition walls within said body extending rearwardly from the open front thereof and dividing the body into end compartments and an intermediate compartment, vertical channel rails mounted at the open front of said body in substantial alinement with said partition walls and constituting inner door jambs, a metal cover fitting over the open front of the intermediate compartment and having inwardly extending side flanges seated in said channel rails, ears extending inwardly from the inner side of said cover in spaced relation to said flanges and disposed parallel to the partition walls, said ears having threaded openings therein, fastening screws passing through openings in the partition walls from the end compartment sides thereof and threadedly connected to the threaded openings for securing the cover in position, doors hinged to the end walls of said body for closing the end compartments, said doors having vertical inwardly extending flanges along their free side edges which enter the channel rails when said doors are closed, and lock means on the doors for securing the doors against unauthorized opening thereof to prevent access to the end compartments and tampering with the fastening screws.

6. A cabinet comprising a rectangular box-like body open at its front, a pair of spaced partition walls within said body extending rearwardly from the open front thereof and dividing the interior of the body into end compartments and an intermediate compartment, door jambs at the front of the partition walls, a removable cover fitting over the open front of the intermediate compartment and having inwardly extending side flanges seated against said door jambs, ears extending inwardly from the inner side of said cover in spaced relation to said flanges and disposed parallel to the partition walls, said ears having threaded openings therein, fastening screws passing through openings in the partition walls from the end compartment sides thereof and threadedly connected to the threaded openings for securing the cover in position, doors hinged to the end walls of said body for closing the end compartments, the outer free side edges of said doors having abutting engagement with said door jambs when the doors are closed, and lock means for securing the doors against unauthorized opening thereof to prevent unauthorized access to the end compartments and prevent tampering with the fastening means.

7. A box for the housing of electrical apparatus comprising a box-like body open at its front, a pair of spaced vertical partition walls within said body extending rearwardly from the open front thereof and dividing the body into end compartments and an intermediate compartment, a removable cover fitting over the intermediate compartment, ears extending inwardly from the inner side of said cover and disposed parallel to and in close confronting relation to said partition walls, removable fastening means passing through said partition walls and said ears and accessible from within the end compartments for securing the cover in position, hinged doors respectively closing the end compartments, and lock means accessible exteriorly of the doors for securing them in locked closed position over the open fronts of the respective end compartments to prevent unauthorized opening of the doors for entry into the end compartments and to prevent unauthorized tampering with the removable fastening means.

CARLL W. STRONG.
RALPH M. WALKER.